(12) United States Patent
Zeyfang

(10) Patent No.: US 7,727,593 B2
(45) Date of Patent: *Jun. 1, 2010

(54) CAP AND PLUG MASKING OR SHIPPING

(75) Inventor: Frederick W. Zeyfang, Erie, PA (US)

(73) Assignee: Protective Industries, Inc., Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/320,058

(22) Filed: Jan. 15, 2009

(65) Prior Publication Data

US 2009/0165882 A1 Jul. 2, 2009

Related U.S. Application Data

(62) Division of application No. 11/585,131, filed on Oct. 24, 2006, now Pat. No. 7,487,801.

(51) Int. Cl.
*B05D 3/02* (2006.01)
*F16L 57/00* (2006.01)

(52) U.S. Cl. .................. 427/372.2; 138/96 R; 138/89; 427/427.4; 427/384; 220/785; 220/797; 220/802; 220/366.1

(58) Field of Classification Search ............... 138/96 R, 138/96 T, 89, 146; 220/785, 797, 801, 802, 220/366.1, 367.1, 790; 427/372.2, 384, 427.4
See application file for complete search history.

(56) References Cited

U.S. PATENT DOCUMENTS

| | | | |
|---|---|---|---|
| 2,095,528 A | 10/1937 | Osborn et al. | |
| 2,321,667 A | 6/1943 | Foster | |
| 2,727,651 A | 12/1955 | Mickelson | |
| 3,187,777 A * | 6/1965 | Ashlock | 138/96 R |
| 3,307,552 A | 3/1967 | Strawn | |
| 3,490,488 A | 1/1970 | Grist | |
| 3,565,664 A * | 2/1971 | Al | 427/185 |
| 3,610,288 A * | 10/1971 | Carr | 138/96 R |
| 3,621,623 A | 11/1971 | MacMillan | |
| 3,661,184 A | 5/1972 | Lachenmayer et al. | |
| 3,744,528 A | 7/1973 | Vestal | |
| 3,927,798 A | 12/1975 | Loomis | |
| 3,987,930 A | 10/1976 | Fuson | |
| 3,996,966 A | 12/1976 | Princell | |
| 4,139,005 A | 2/1979 | Dickey | |
| 4,185,665 A | 1/1980 | Flimon | |
| 4,204,606 A | 5/1980 | Micheli et al. | |
| 4,210,179 A | 7/1980 | Galer | |

(Continued)

*Primary Examiner*—James F Hook

(57) ABSTRACT

A method for providing a cured coating on a tube, comprising masking and sealing an end of the tube with a self-venting cap and plug, the cap and plug comprising a tubular member comprising a resilient material having an open end and a closed end, and having an outermost sidewall; the outermost sidewall having an interior surface having an annular ridge; the closed end having a hollow dome portion defined by an annular recess, the annular recess defining an inner sidewall with an upwardly-extending annular recess, the inner sidewall containing at least one gas venting groove terminating along the longitudinal extent of the inner sidewall, and the inner sidewall being spaced from the interior surface of the outermost sidewall of the tubular member a distance greater than the height of the inwardly-directed ridge; coating the tube with a curable coating; and curing the curable coating at an elevated temperature.

5 Claims, 2 Drawing Sheets

U.S. PATENT DOCUMENTS

| | | |
|---|---|---|
| 4,269,232 A | 5/1981 | Witschi |
| 4,297,155 A | 10/1981 | Jervis |
| 4,335,756 A | 6/1982 | Sharp et al. |
| 4,483,371 A | 11/1984 | Susin |
| 4,889,256 A | 12/1989 | Fowles |
| 5,427,266 A | 6/1995 | Yun |
| 5,613,615 A | 3/1997 | Zeyfang et al. |
| 5,706,860 A | 1/1998 | Gonyea |
| 5,722,562 A | 3/1998 | Kick |
| 5,908,048 A | 6/1999 | Van Driel |
| 6,367,508 B1 | 4/2002 | Richards et al. |
| 6,408,887 B2 | 6/2002 | Rahimzadeh et al. |
| 6,562,300 B2 | 5/2003 | Rosen et al. |
| 2004/0084099 A1 | 5/2004 | Miura |
| 2007/0160754 A1* | 7/2007 | Blaise-Graftieaux et al. ..... 427/230 |

\* cited by examiner

CAP AND PLUG MASKING OR SHIPPING

This application is a divisional of application No. 11/585,131, filed Oct. 24, 2006, now U.S. Pat. No. 7,487,801.

BACKGROUND OF THE PRESENT INVENTION

The present invention is directed to a self-venting cap and plug which is particularly adapted for protective use in masking or shipping.

A variety of closure means are known which are used for a variety of end uses such as to seal an end of a pipe, providing masking means, providing means to protect the end of a pipe or tube during shipping, etc.

Exemplary patents which disclose a variety of end closures include but are not limited to U.S. Pat. Nos. 2,095,528; 2,321,667; 2,727,651; 3,307,552; 3,490,488; 3,661,184; 3,744,528; 3,927,798; 3,987,930; 4,139,005; 4,204,606; 4,210,179; 4,335,756; 4,483,371; 4,889,256; 5,613,615; 5,706,860; 6,367,508; 6,408,887; 6,562,300.

However, despite the various advantages that may result from the use of the various end caps or closures disclosed by the above patents, a need still exists to provide a cap and plug closure that provides enhanced closure with respect to the tube or pipe with which the cap and plug is used, together with desirable venting for gases present in the tube or pipe.

OBJECTS AND SUMMARY OF THE PRESENT INVENTION

It is accordingly an object of the present invention to provide a cap and plug which provides improved venting of gases from within a capped tube or pipe.

It is further an object of the present invention to provide a cap and plug which provides improved masking of a tube or pipe.

In accordance with the present invention, there is thus provided a method for providing a cured coating on a pipe or tube, said method comprising:

masking and sealing an end of a pipe or tube to be coated with a self-venting cap and plug, said cap and plug comprising a tubular member comprised of a resilient material having an open end and a closed end, and having an outermost sidewall extending therebetween;

said outermost sidewall having an interior surface having an inwardly-directed ridge which extends from said interior surface as well as circumferentially along at least a centrally-disposed portion of said interior surface of said outermost sidewall and spaced from said closed end;

said closed end comprising a centrally-positioned upwardly-extending hollow dome portion defined by a downwardly-extending open-ended annular recess in a top surface of said closed end, said annular recess also defining an inner sidewall spaced from and opposing said interior surface of said outermost sidewall of the tubular member with an upwardly-extending annular recess being formed therebetween, said inner sidewall containing at least one gas venting groove extending along the longitudinal extent of said inner sidewall from an upper portion of said inner sidewall to a lower portion of said inner sidewall, said at least one gas vent groove terminating along a longitudinal extent of said inner sidewall, and the inner sidewall being spaced from said interior surface of the outermost sidewall of the tubular member a distance greater than the height of the inwardly-directed ridge.

DETAILED DESCRIPTION OF THE PRESENT INVENTION

The improved cap and plug of the present invention will be described in connection with the Figures.

The cap and plug 1 shown in the Figures is a molded tubular member comprised of a resilient material and having a closed end 3 and an open end 5, and having an outermost sidewall 23 therebetween.

Figure 4:
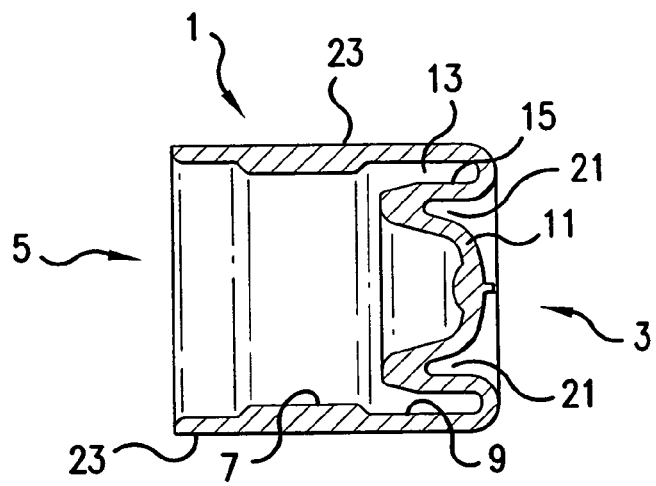
FIG. 4 is a view in cross-section of the cap and plug of the present invention.
Figure 5:
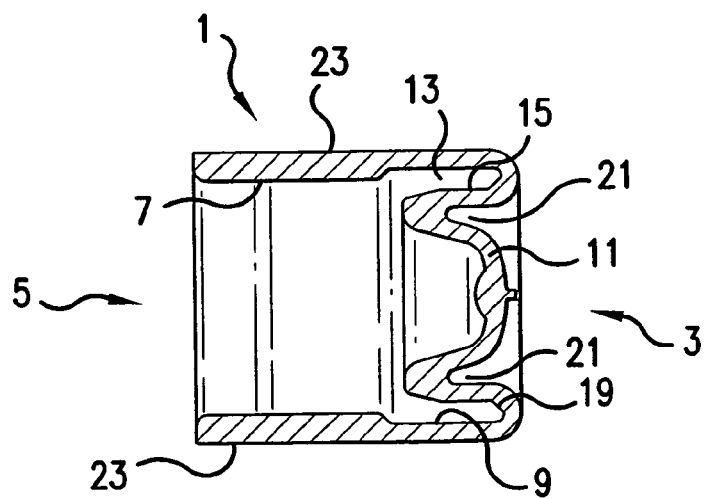
FIG. 5 is a view in cross-section of another embodiment of the cap and plug of the present invention.

The sidewall 23 has an interior surface 9 which has an inwardly-directed ridge 7 extending circumferentially along at least a centrally-disposed portion of the interior surface of the sidewall. The inwardly-directed ridge 7 is shown in FIG. 4 as extending along a centrally-disposed portion of the interior surface. FIG. 5 depicts an embodiment wherein the inwardly-directed ridge 7 extends to the open end of the body.

The closed end comprises a centrally-positioned hollow dome portion 11 in a top surface thereof. The dome portion is defined by a downwardly-extending open-ended annular recess 21 in the top surface. The annular recess 21 also define an inner sidewall 15 spaced from and opposing the interior surface 9 of the outermost sidewall of the tubular member.

Figure 1:
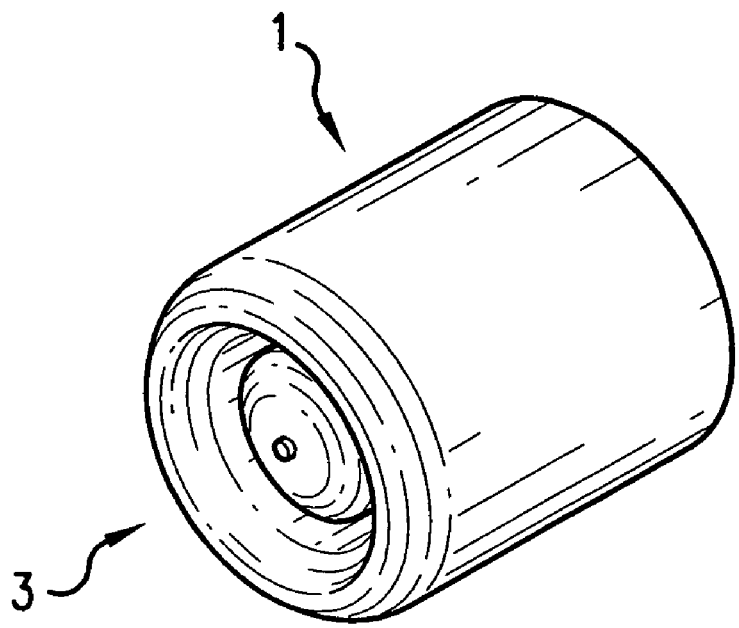
FIG. 1 is a view in perspective of the top portion of the cap and plug of the present invention.
Figure 2:
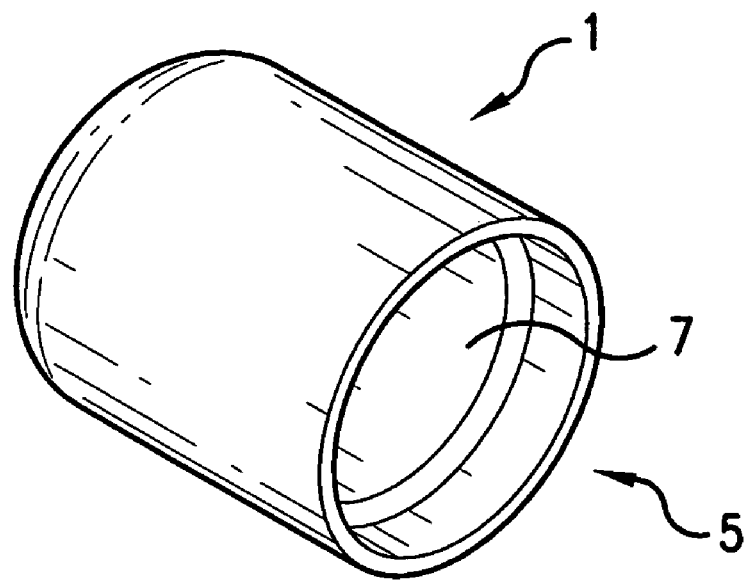
FIG. 2 is a view in perspective of the bottom portion of the cap and plug of the present invention.
Figure 3:
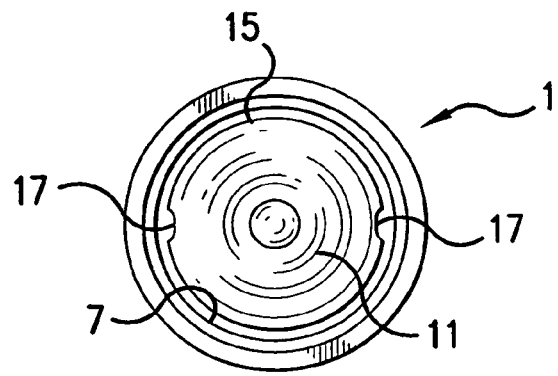
FIG. 3 is a bottom view of the cap and plug of the present invention.

The inner sidewall 15 defined by the annular recess 21 contains at least one gas vent groove 17 extending along the longitudinal extent of the inner sidewall from an upper portion of the inner sidewall toward a lowermost portion of the inner sidewall, and terminating along the longitudinal extent of the inner sidewall. While two vent grooves are depicted in FIG. 3 positioned at opposite sides, the use of more than two vent grooves may be appropriate as desired.

The inner sidewall 15 being spaced from the interior surface 9 of the outermost sidewall defines an upwardly-extending annular recess 13 and is spaced from the interior surface 9 of the sidewall of the tubular member a distance greater than the height of the inwardly-directed ridge. Preferably, the uppermost extent of the inwardly-directed ridge is spaced longitudinally from the lowermost extent of the upwardly-extending annular recess 13. Such spacing enhances the ability of the cap and plug to snugly engage with an inserted pipe or tube.

The particular configuration of the end surface of the annular recess 13 is not critical to practice of the present invention. For instance, FIG. 4 depicts the end of the annular recess 13 as including a curved portion, while FIG. 5 depicts the end of the annular recess 13 as including an oblique surface.

During use, the cap and plug of the present invention is employed with advantage during the coating of tubes or pipes, whereby an end portion of the tube or pipe is required to be masked during the coating process. Such pipes or tubes are generally hollow and open-ended at one end. For instance, during powder coating of a metal tube or pipe, the cap and plug of the present invention, when inserted onto the end of the tube or pipe, serves to mask the covered portion of the tube or pipe during the coating process. The design of the cap and plug also provides additional advantages. Prior to being coated, it is frequently necessary to wash the exterior surface of the tube or pipe to prepare the surface for coating. It is desirable to seal the end of the tube or pipe during the washing process to prevent entry of wash liquid or contaminants from entering the interior of the hollow tube or pipe. The presence of the cap and plug of the present invention accordingly serves to seal the end of the tube or pipe.

Further, after the coating step, it is generally necessary to cure the coating on the surface of the tube or pipe which involves subjecting the coated tube or pipe to elevated temperatures sufficient to cure the coating. The exposure of the capped tube or pipe to elevated temperatures causes gas (such as air) trapped in the capped tube or pipe to expand. Absent some means to permit such expanded gas to escape, the cap and plug may be blown off the end of the tube or pipe.

The present invention addresses this issue by providing a cap and plug comprised of a material which becomes sufficiently flexible at the elevated curing temperature such that, as the internally-trapped gas begins to expand, the walls of the cap and plug are caused to expand to an extent sufficient to permit the expanding gas to escape without the cap and plug being blown off the pipe or tube. The presence of the gas vent grooves 17 also serves to assist the internally-trapped gas to escape toward the top portion of the cap and plug. The presence of the dome portion permits heated gas to also expand therein which flexes the adjacent inner surfaces away from the end of the pipe or tube to assist in venting gas.

The plug body can be formed from any conventional polymeric material which provides the requisite balance of physical stability and flexibility during use. Any conventional moldable polymer such as flexible polymeric materials can be used as the raw material for the plug body of the present invention. Thermoplastic rubber or elastomeric materials are preferred to permit adequate flexibility when being inserted into a cavity for sealing, while maintaining desired resilience for purposes of sealing. The material chosen shall be both dimensionally stable at ambient and those elevated temperatures used for curing any coating applied to the pipe or tube. Such materials are well known in the art and one of ordinary skill in the art can readily select an appropriate material for use in the present invention.

The plug may be made by any conventional molding process, with the method of manufacture being well within the skill of the practitioner in the art. For instance, the cap and plug may be formed by injection molding processes known to those skilled in the art. In such a process, a polymeric material such as polyethylene or polypropylene material may be used that yields a cap body sufficiently elastic or conformable to permit the body to snugly engage the end of a pipe or tube while retaining sufficient stability and exhibiting the desired flexibility at curing temperatures. Accidental disengagement of the cap body is thus avoided.

What is claimed is:

1. A method for providing a cured coating on a pipe or tube, said method comprising:

masking and sealing an end of said pipe or tube to be coated with a self-venting cap and plug, said cap and plug comprising a tubular member comprised of a resilient material having an open end and a closed end, and having an outermost sidewall extending therebetween;

said outermost sidewall having an interior surface having an inwardly-directed ridge extending from said interior surface as well as continuously around the entire inner circumference of the tubular member along at least a centrally-disposed portion of said interior surface of said outermost sidewall and spaced from said closed end;

said closed end comprising a centrally-positioned upwardly-extending hollow dome portion defined by a downwardly-extending open-ended annular recess in a topmost surface of said closed end, said annular recess also defining an inner sidewall spaced from and opposing said interior surface of said outermost sidewall of the tubular member with an upwardly-extending annular recess being formed therebetween, said inner sidewall containing at least one gas venting groove extending along the longtitudinal extent of said inner sidewall from an upper portion of said inner sidewall to a lower portion of said inner sidewall, said gas venting groove terminating along the longitudinal extent said inner sidewall, and said inner sidewall being spaced from said interior surface of said outermost sidewall of said tubular member a distance greater than the height of said inwardly-directed ridge;

coating said pipe or tube with a heat-curable coating, and curing said heat-curable coating at an elevated temperature.

2. The method of claim 1, wherein an uppermost extent of said inwardly-directed ridge is spaced longitudinally from a lowermost extent of said upwardly-extending annular recess.

3. The method of claim 1, wherein said upwardly-extending annular recess includes an oblique surface at an uppermost portion thereof extending across said recess.

4. The method of claim 1, wherein said inwardly-directed ridge extends to said open end.

5. The method of claim 1, wherein said inner sidewall includes multiple gas venting grooves.

\* \* \* \* \*